(12) United States Patent
Törnqvist (10) Patent No.: US 9,782,670 B2
(45) Date of Patent: Oct. 10, 2017

(54) COMPUTER PROGRAM, METHOD, AND SYSTEM FOR ENABLING AN INTERACTIVE EVENT AMONG A PLURALITY OF PERSONS

(71) Applicant: Ubisoft Entertainment, S.A., Rennes (FR)

(72) Inventor: Björn Törnqvist, Malmö (SE)

(73) Assignee: Ubisoft Entertainment, Rennes (FR)

( * ) Notice: Subject to any disclaimer, the term of this patent is extended or adjusted under 35 U.S.C. 154(b) by 417 days.

(21) Appl. No.: 14/261,964

(22) Filed: Apr. 25, 2014

(65) Prior Publication Data

US 2015/0306498 A1    Oct. 29, 2015

(51) Int. Cl.
*A63F 9/24*     (2006.01)
*A63F 13/215*   (2014.01)
*H04L 29/08*    (2006.01)
*A63F 13/814*   (2014.01)
*A63F 13/211*   (2014.01)
(Continued)

(52) U.S. Cl.
CPC .......... *A63F 13/215* (2014.09); *A63F 13/211* (2014.09); *A63F 13/35* (2014.09); *A63F 13/77* (2014.09); *A63F 13/814* (2014.09); *H04L 67/10* (2013.01)

(58) Field of Classification Search
None
See application file for complete search history.

(56) References Cited

U.S. PATENT DOCUMENTS

| 5,930,752 A | 7/1999 | Kawaguchi et al. |
| 6,042,477 A | 3/2000 | Addink |
| 6,659,861 B1 | 12/2003 | Faris et al. |
| (Continued) | | |

FOREIGN PATENT DOCUMENTS

| WO | 2012/166989 A2 | 12/2012 |
| WO | 2012166989 A2 | 12/2012 |

OTHER PUBLICATIONS

Notification of Transmittal of the International Search Report and the Written Opinion of the International Searching Authority, or the Declaration dated Mar. 27, 2015; International Application No. PCT/IB2014/001361; International Filing Date: May 27, 2014.
(Continued)

*Primary Examiner* — Jason Yen
(74) *Attorney, Agent, or Firm* — Erise IP, P.A.

(57) ABSTRACT

A computer program, method, and system for participating in interactive events includes a personal input executing an event application, a client device coupled to a display and executing a display application, and a server executing a server application. The display application receives a request from a player to participate in an event, receives the event from the server application, shows the event on the display, and determines an event start time corresponding to a time at which the start of the event is shown on the display. The event application receives sensor data from a sensor, compares the sensor data to reference data to generate a score, forms a plurality of packets containing the score, and transmits the packets. The server application transmits the event to the display application, receives the score from the event application, and transmits the score to the display application.

19 Claims, 7 Drawing Sheets

(51) Int. Cl.
*A63F 13/35* (2014.01)
*A63F 13/77* (2014.01)

(56) References Cited

U.S. PATENT DOCUMENTS

| | | |
|---|---|---|
| 7,258,614 B1 | 8/2007 | Kates et al. |
| 7,288,028 B2 | 10/2007 | Rodriquez et al. |
| 7,803,054 B1 | 9/2010 | Ogus et al. |
| 2001/0054349 A1* | 12/2001 | Park ................ A63F 13/10 84/611 |
| 2002/0019258 A1 | 2/2002 | Kim et al. |
| 2004/0142750 A1 | 7/2004 | Glisson et al. |
| 2005/0086301 A1 | 4/2005 | Eichler et al. |
| 2007/0061851 A1 | 3/2007 | Deshpande et al. |
| 2007/0167240 A1* | 7/2007 | Takeshi ............. A63F 13/12 463/42 |
| 2007/0216691 A1 | 9/2007 | Dobrin |
| 2008/0146342 A1 | 6/2008 | Harvey et al. |
| 2008/0182644 A1 | 7/2008 | Lutnick et al. |
| 2008/0242409 A1 | 10/2008 | Schueller |
| 2008/0318625 A1* | 12/2008 | Rofougaran ......... G01S 13/426 455/556.1 |
| 2009/0119737 A1 | 5/2009 | Perlman et al. |
| 2010/0022302 A1 | 1/2010 | Iwakiri et al. |
| 2011/0151975 A1* | 6/2011 | Mori ................ A63F 13/12 463/42 |
| 2011/0267269 A1 | 11/2011 | Tardiff et al. |
| 2012/0088561 A1* | 4/2012 | Hohmann ............ A63F 9/183 463/1 |
| 2012/0143358 A1 | 6/2012 | Adams et al. |
| 2012/0165100 A1* | 6/2012 | Lalancette ......... A63F 13/10 463/42 |
| 2014/0015650 A1* | 1/2014 | Ur ................... A63F 13/10 340/407.1 |

OTHER PUBLICATIONS

Xbox Live messaging, chat, and parties, http://support.xbox.com/en-US/xbox-live/social/chat-messaging, Date Printed: Feb. 13, 2013, Date Posted: Unknown.

U.S. Appl. No. 13/912,935 Select File History Jul. 25, 2013 to Nov. 18, 2015, 59 pages.

* cited by examiner

COMPUTER PROGRAM, METHOD, AND SYSTEM FOR ENABLING AN INTERACTIVE EVENT AMONG A PLURALITY OF PERSONS

BACKGROUND

1. Field

Embodiments of the invention relate to interactive events with a plurality of participants communicating through a communication network. In particular, embodiments of the invention provide a computer program, a method, and a system for participating in an interactive event, such as a massively multiplayer game.

2. Related Art

Interactive events, such as electronic games, or video games, often involve multiple players playing the same game. To participate, the players may utilize a computer, or similar console, with a keyboard, a mouse, a joystick, or other game input. In some situations, the players may be geographically isolated from one another and thus may communicate with each other and/or a server through a communication network, such as the Internet. In traditional paradigms, all of the players may connect to a server, which monitors the game. The network through which the players communicate with the server has inherent delays or latencies. There are latencies both when the players communicate with the server and when the server communicates with the players. Furthermore, the latencies may be different for each player and may vary with time or activities on the network. Scoring of the game generally depends on a player's response time to actions of the game, with the highest score usually granted to the player with the shortest response time. The latencies of the network may interfere with fair scoring of the game. Not only do players receive the actions on their computer or console at different times, but also the responses to the actions are transmitted back to the server with different latencies. Thus, the player who receives the action the quickest and has the lowest latency in transmitting a response may be awarded the highest score even though his response time may not be the shortest.

In other paradigms, players may play a game by communicating with one another in a peer-to-peer setup rather than a client-server setup. In addition, a massive number of players (in the hundreds to even thousands of players) may play a game at the same general location generating a large amount of bandwidth. Generally, the activities of each player are broadcast to every other player. An issue of concern is the amount of transmission bandwidth, sometimes known as upstream bandwidth, each player has. In contrast to the client-server setup, wherein each player typically only transmits to the server, each player has to transmit to every other player in the game with the peer-to-peer setup. Usually, Internet service providers (ISPs) provide users with much lower upstream bandwidth than downstream bandwidth. For players with low upstream bandwidth, the peer-to-peer setup could be problematic. For massive numbers of players, even a large amount of upstream bandwidth could be problematic.

SUMMARY

Embodiments of the invention solve the above-mentioned problems and provide a distinct advance in the art of participating in an interactive event, such as an electronic game. More particularly, embodiments of the invention provide solutions to the problems of fair scoring, limited upstream bandwidth to individual users, and massive numbers of players participating in the same event while at the same geographic location. Embodiments of the invention provide a system for participating in an interactive event that records the times at which a player is presented with the actions of the event and the times at which the player responded. Given these times, the system can score the player based on the player's actual response time and not the time at which a server received the player's actions. Thus, the latencies of a communication network and upstream bandwidth are not a factor in the event.

Embodiments of the invention provide a system for participating in an interactive event comprising a personal input executing an event application, a client device coupled to a display and executing a display application, and a server executing a server application. The display application is configured to receive a request from a player to participate in an event, receive the event from the server application, show the event on the display, and determine an event start time corresponding to a time at which the start of the event is shown on the display. The event application is configured to receive sensor data from a sensor, compare the sensor data to reference data to generate a score, form a plurality of packets containing the score, and transmit the packets. The server application is configured to transmit the event to the display application, receive the event start time from the display application, receive the score from the event application, and transmit the score to the display application.

Embodiments of the invention also provide a system for participating in an interactive event comprising a personal input executing an event application, a client device coupled to a display and executing a display application, and a server executing a server application. The display application is configured to receive a request from a player to participate in an event, receive the event from the server application, show the event on the display, and determine an event start time corresponding to a time at which the start of the event is shown on the display. The event application is configured to receive the event start time from the display application, receive sensor data from a sensor, compare the sensor data to reference data to generate a score, form a plurality of packets containing the score, and transmit the packets. The server application is configured to transmit the event to the display application, receive the score from the event application, and transmit the score to the display application.

Even further embodiments of the invention provide a system for participating in an interactive event comprising a client device coupled to a display and executing a display application, a personal input coupled to a capture device and executing an event application, and a server executing a server application. The display application is configured to receive a request from a player to participate in an event, receive the event from the server application, and show the event on the display. The event application is configured to receive data related to the performance from a sensor, transmit the data related to the performance to the server application, create an audio or visual recording of the event from the capture device, and transmit the recording to the server application. The server application is configured to receive the data related to the performance from the event application, receive the recording from the event application, incorporate a score based on the data related to the performance into the event, incorporate the recording into the event, and transmit the event to the display application.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
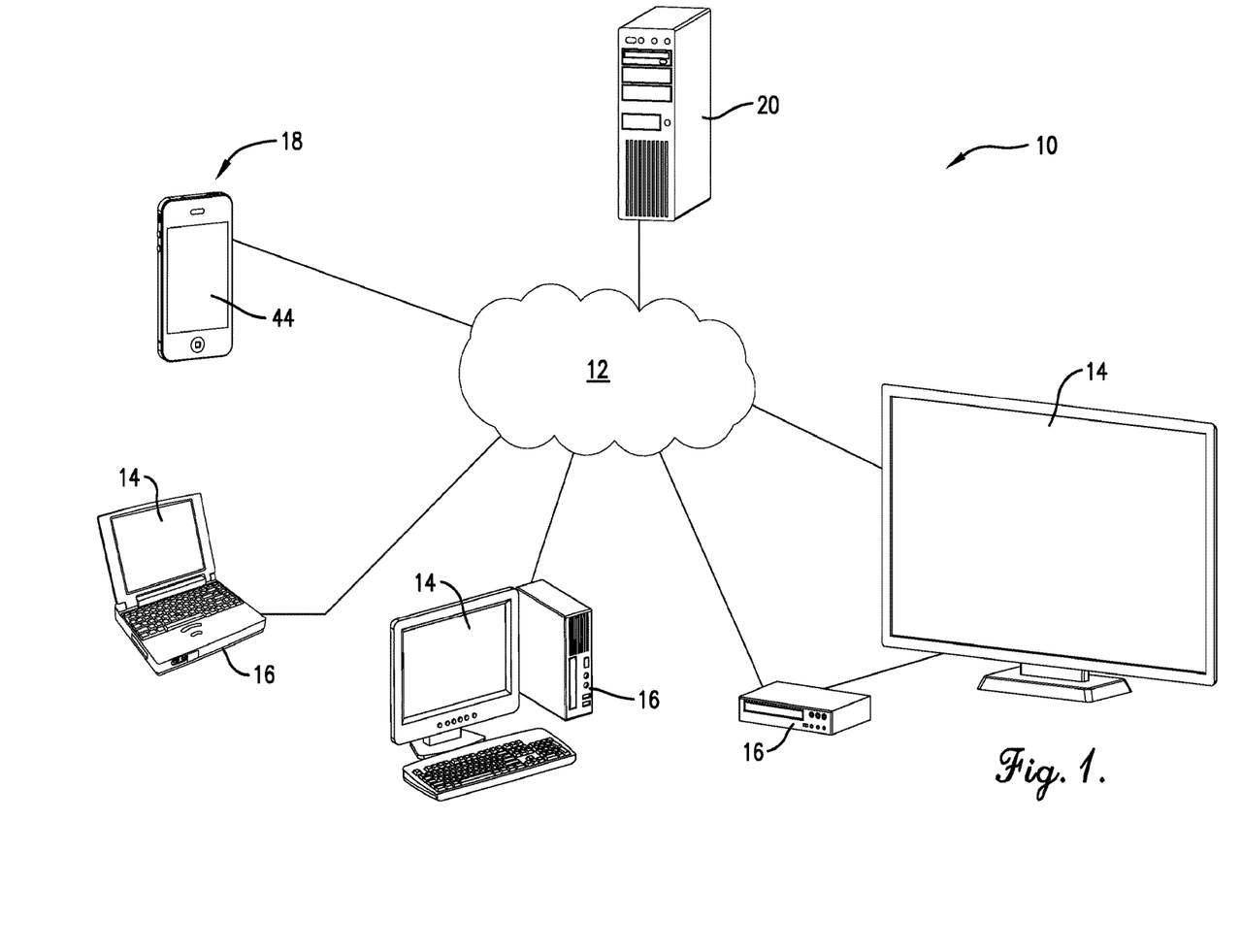
FIG. 1 is a schematic block diagram of a system for participating in an interactive event, constructed in accordance with various embodiments of the current invention, the figure depicting a communication network, a display, a client device, a personal input, and a server.
Figure 2A:
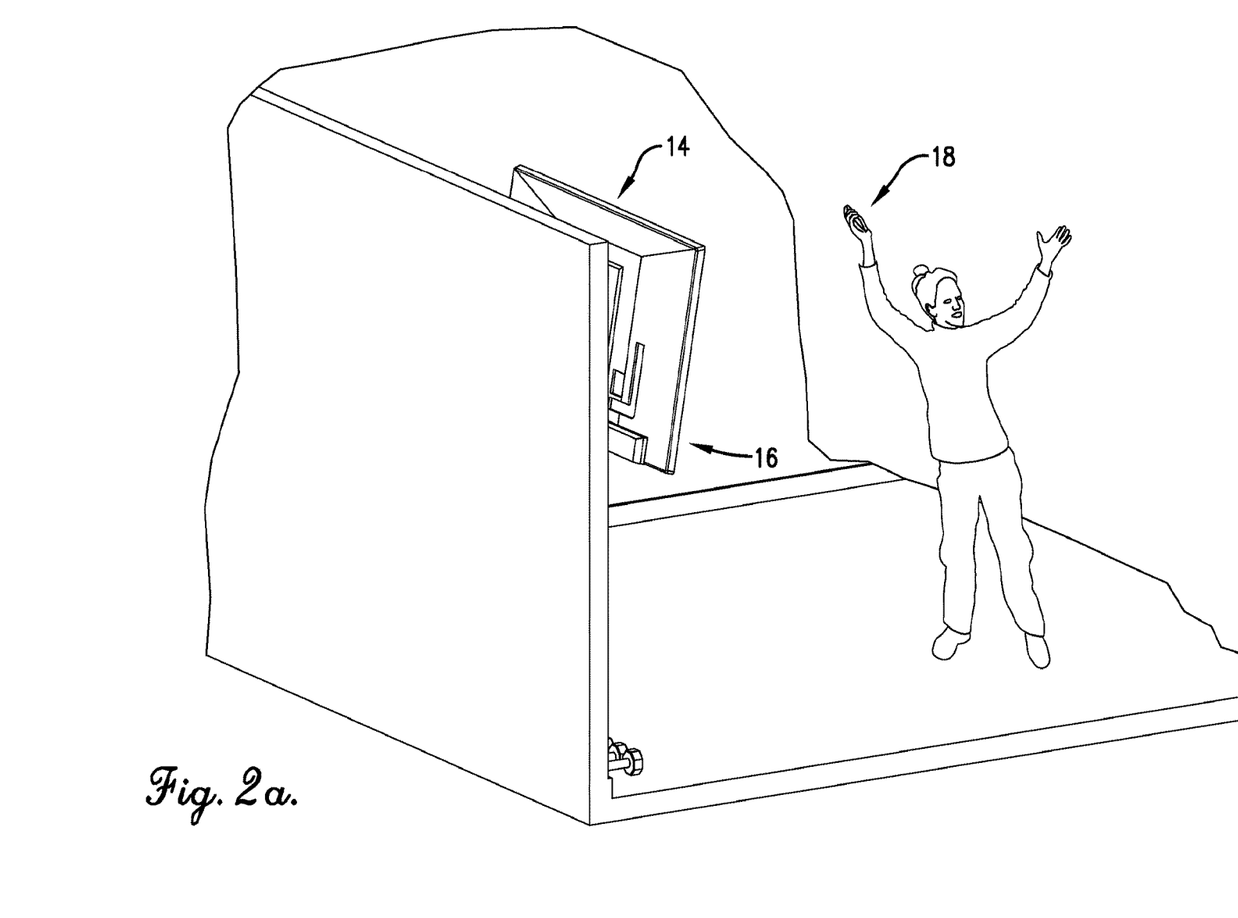
FIG. 2a is an environmental view from a forward perspective of a first player participating in an event, such as an electronic game, the figure depicting the display and the personal input.
Figure 2B:
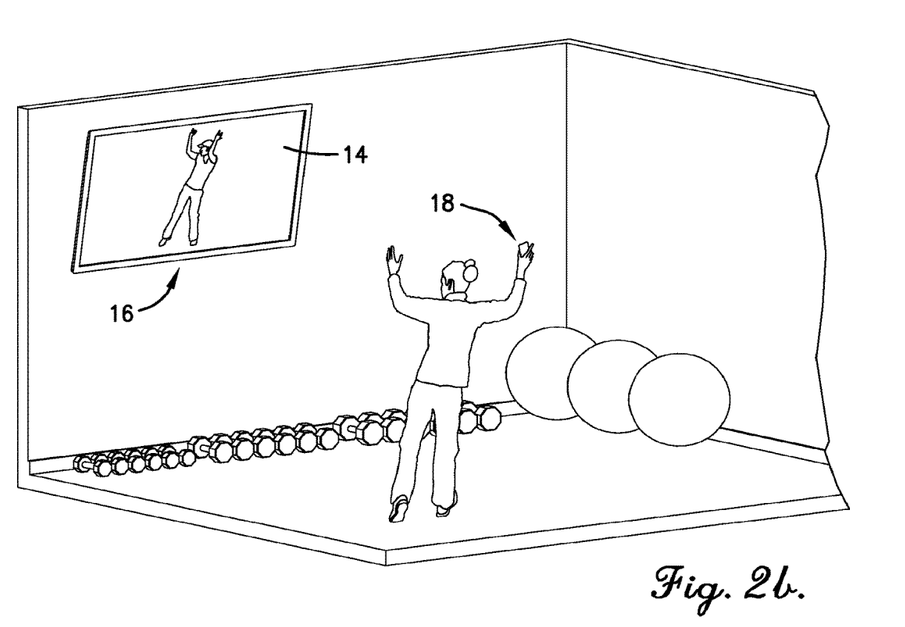
FIG. 2b is an environmental view from a rear perspective of the first player playing the electronic game.
Figure 3:
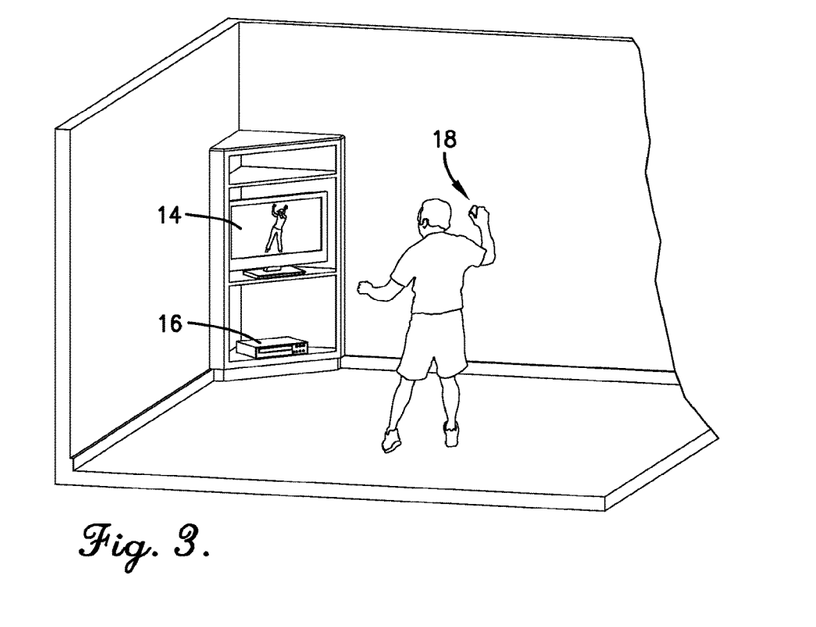
FIG. 3 is an environmental view from a rear perspective of a second player playing the electronic game, the figure also depicting the display, the personal input, and the client device.
Figure 4:
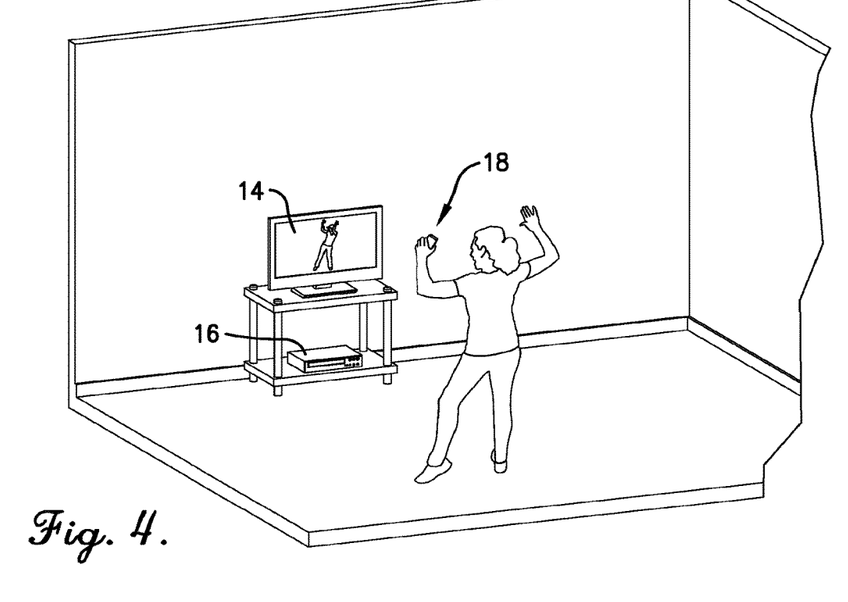
FIG. 4 is an environmental view from a rear perspective of a third player playing the electronic game, the figure depicting the display, the personal input, and the client device.
Figure 5:
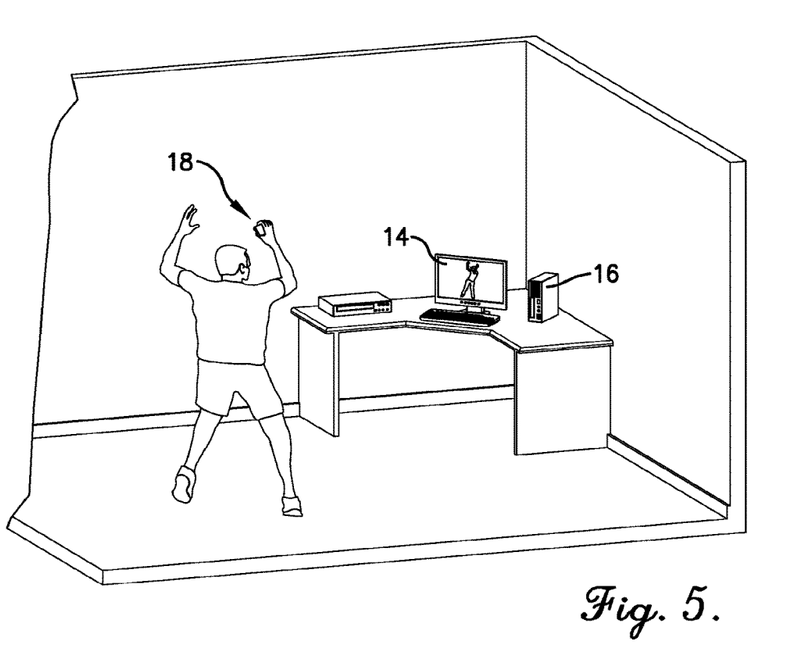
FIG. 5 is an environmental view from a rear perspective of a fourth player playing the electronic game, the figure depicting the display, the personal input, and the client device.

A system 10 that may be used for participating in an interactive event, constructed in accordance with various embodiments of the current invention, is shown in FIG. 1. The event could be, or may include, playing electronic or computer-based games on a communication network 12. The electronic games, hereinafter "game" or "games", typically include interactive video games in which the player responds to images on a display 14. The player may engage in actions or motions when prompted by proceedings shown on the display 14. For example, the player may dance by mimicking or following the motions of a dance leader shown on the display 14. Or, the player may simulate participating in a sport, such as throwing a baseball, hitting a tennis ball, or dribbling a basketball. In addition, the player may engage in simulated combat activity such as boxing. Alternatively, the player may respond to proceedings on the display 14 by singing. In other games, the player may respond to trivia questions either verbally or through a button press. Thus, the games may include dancing games, sporting games, such as basketball, baseball, tennis, golf, bowling, and the like, combat games, role-playing games, adventure games, and so on. In embodiments of the invention, the interactive events may be movement not related to games such as exercise, rehabilitation, or diagnostic, such as response time measurements.

The system 10 may broadly comprise a client device 16, a personal input 18, a server 20, a display application 22, an event application 24, and a server application 26. By way of example to demonstrate the features of embodiments of the invention, but not intended to be limiting, an electronic game and in particular, a dancing game, will be the interactive event discussed in this application and shown in the figures. Furthermore, embodiments of the invention may be implemented in hardware, software, firmware, or combinations thereof.

The communication network 12 generally allows communication between the personal inputs 18 and the server 20 as well as the server 20 and the client devices 16. The communication network 12 may include local area networks, metro area networks, wide area networks, cloud networks, the Internet, intranets, and the like, or combinations thereof. The communication network 12 may also include or connect to voice and data communication systems such as cellular networks, such as 2G, 3G, or 4G, and public ordinary telephone systems. The communication network 12 may be wired, wireless, or combinations thereof and may include components such as switches, routers, hubs, access points, and the like. Furthermore, the communication network 12 may include components or devices that are capable of transmitting and receiving radio frequency (RF) communication using wireless standards such as Wi-Fi, Wimax, or other Institute of Electrical and Electronic Engineers (IEEE) 802.11 and 802.16 protocols.

The display 14, as seen in FIGS. 1-6, generally shows or displays the actions and proceedings of the event or game along with scores or information or data related to the game. The display 14 may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), projection, combinations thereof, or the like. The display 14 may possess a square or a rectangular aspect ratio and may be viewed in either a landscape or a portrait mode. Examples of the display 14 include monitors or screens associated with tablets or notebook computers, laptop computers, desktop computers, as well as televisions, smart televisions, wall projectors, theater projectors, or similar video displays.

The client device 16, as seen in FIGS. 1-7, generally receives aspects of the game from the server 20 and communicates the video content of the game to the display 14. In various embodiments, the client device 16 may include or have access to an audio system that receives the audio content of the game. In embodiments of the invention, the client device 16 utilizes the audio system to transmit audio data for reception by the personal input 18, as will be discussed later. The client device 16 may be capable of running or executing web browsers, web viewers, or Internet browsers, which may be used to access the server application 26. Examples of the client device include tablet computers, notebook computers, laptop computers, desktop computers, and the like, as well as smart video devices such as Blu-Ray players or other video streaming devices that are capable of running web browsers or video-based applications. In further embodiments, the client device 16 may be a stand-alone gaming console. In various embodiments, the client device 16 may be incorporated with, integrated with, or housed within the display 14, as shown in FIGS. 2a-2b. Furthermore, the client device 16 may execute or run the display application 22.

Figure 7:
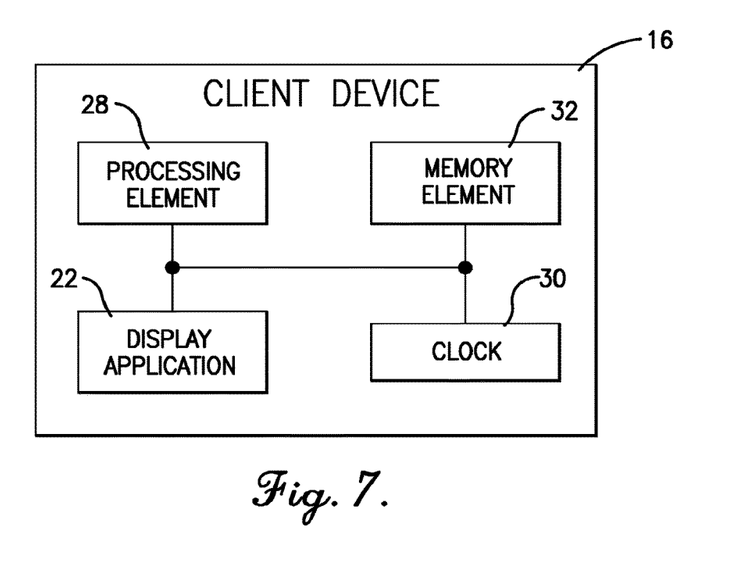
FIG. 7 is a schematic block diagram of the client device.

The client device 16 may include a processing element 28, a clock 30, and a memory element 32. The processing element 28 may include processors, microprocessors, microcontrollers, digital signal processors (DSPs), field-programmable gate arrays (FPGAs), analog and/or digital application-specific integrated circuits (ASICs), and the like, or combinations thereof. The processing element 28 may generally execute, process, or run instructions, code, software, firmware, programs, applications, apps, processes, services, daemons, or the like, or may step through states of a finite-state machine.

The clock 30 may include circuitry such as oscillators, multivibrators, phase-locked loops, counters, or combinations thereof, and may generate or measure timing data such as the time period that elapses between two actions. Given communication with an external time of day source, the clock circuitry may also generate time of day data. The clock circuitry may be able to generate timing or time of day data with a resolution ranging from approximately 1 millisecond (ms) to approximately 10 ms. The clock 30 may be in communication with the processing element 28 and the memory element 32, and may be accessed by the display application 22.

The memory element 32 may include data storage components such as read-only memory (ROM), programmable ROM, erasable programmable ROM, random-access memory (RAM), hard disks, floppy disks, optical disks, flash memory, thumb drives, universal serial bus (USB) drives, and the like, or combinations thereof. The memory element 32 may include, or may constitute, a non-transitory "computer-readable storage medium". The memory element 32 may store the instructions, code, software, firmware, programs, applications, apps, services, daemons, or the like that are executed by the processing element 28. The memory element 32 may also store settings, data, documents, sound files, photographs, movies, images, databases, and the like. The processing element 28 may be in communication with the memory element 32 through address busses, data busses, control lines, and the like.

The personal input 18, as seen in FIGS. 1-6 and 8, may generate sensor data based on the motions of the player in response to the game and may transmit the sensor data to the server 20. In embodiments of the invention and as discussed later, the personal input 18 does not transmit the sensor data to the server 20. In this embodiment, the personal input 18 calculates a score based on the sensor data and transmits the score to the server 20. The personal input 18 is generally held in the player's hand. In embodiments of the invention, the player is instructed to hold or otherwise attach the personal input 18 to the player's right hand/wrist. Alternatively, the player is questioned as to which hand is his dominant hand (i.e., the hand in which the player prefers to hold the personal input 18), and the generated sensor data accounts for whether the player holds the personal input in his left or right hand. In yet further embodiments of the invention, the personal input 18 may be strapped, or otherwise coupled, to the player's wrist, arm, ankle, leg, or otherwise strapped to the player's body.

Figure 8:
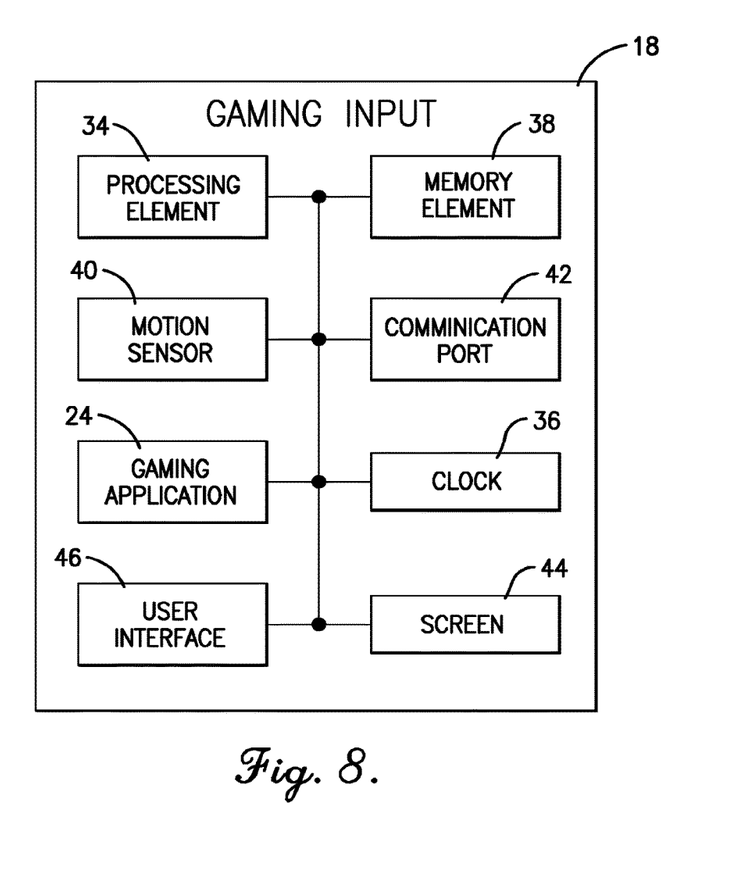
FIG. 8 is a schematic block diagram of the personal input.

The personal input 18 may include a processing element 34, a clock 36, a memory element 38, a sensor 40, and a communication port 42. Furthermore, the personal input 18 may include a screen 44 and a user interface 46 with inputs such as buttons, pushbuttons, keypads, keyboards, or combinations thereof. The user interface 46 may also include a touch screen occupying the entire screen 44 or a portion thereof so that the screen 44 functions as part of the user interface 46. In some embodiments, the personal input 18 may further include a camera or other video capture device. The personal input 18 may also include a microphone or other audio capture device; a retina scanner for determining eye movement; a heart rate or other physiological sensor; a brainwave sensor; or a force sensor for determining a load applied to an object.

Examples of the personal input 18 include smart phones, cell phones, mobile phones, personal digital assistants (PDAs), smart watches, smart bracelets, wearable smart bands or straps, Wi-Fi-enabled watches, Wi-Fi-enabled bracelets, wearable Wi-Fi-enabled bands or straps, and the like. In embodiments of the invention, the personal input 18 may additionally comprise an electronic accessory (not depicted) such as a networked smart strap. In this embodiment the sensor 40 is located in the networked smart strap and communicates the activity of the player to the personal input 18 through a wired or wireless communication protocol. For exemplary purposes, the wireless communication protocol may include Bluetooth™ or near field communication.

The processing element 34 may be substantially the same as the processing element 28 in structure and function. The clock 36 may be substantially the same as the clock 30 in structure and function and may be accessed by the event application 24. The memory element 38 may be substantially the same as the memory element 32 in structure and function and may include or may constitute a computer-readable storage medium.

The sensor 40 generally senses or detects movements or actions of the participant. In some embodiments, the sensor 40 may sense motion and may broadly include accelerometers, tilt sensors, inclinometers, gyroscopes, combinations thereof, or other devices including piezoelectric, piezoresistive, capacitive sensing, or micro electromechanical systems (MEMS) components. The sensor 40 may sense motion along one axis of motion or multiple axes of motion. Sensors 40 that sense motion along three orthogonal axes, such as X, Y, and Z, may be used. In various embodiments, the sensor 40 may measure the acceleration, such as the gravitational (G) force, of the personal input 18 and may output the measured data in a digital binary format. An exemplary range of acceleration data may be from approximately 1, at low acceleration, to approximately 30, at high acceleration.

In other embodiments, the sensor 40 may sense acts or activities of the participant, such as singing. Thus, the sensor 40 may include a microphone or other transducing components that capture sound and produce audio data. For example, the sensor 40 may sense sound emitted from the client device 16. As discussed below, the audio data from the client device 16 may be used by the personal input 18 to synchronize the client device and the personal input. The audio data may also be used to communicate information about the game from the client device 16 to the personal input 18. In yet other embodiments, the sensor 40 may include optical sensors such as still cameras, motion video cameras, photodetectors, and the like that produce video data. In still other embodiments, the sensor 40 may measure pressure data, brainwave activity, eye motion, heart rate activity, and other human physiological quantities. The sensor 40 may sample data at a frequency that may range from approximately 2 hertz (Hz) to approximately 500 Hz. The sensor 40 may be in communication with the processing element 34 and the memory element 38. It is to be understood that other sensing technologies may also be used.

The communication port 42 generally allows the personal input 18 to communicate with the server 20 through the communication network 12. The communication port 42 may be wireless and may include antennas, signal or data receiving circuits, and signal or data transmitting circuits. The communication port 42 may transmit and receive radio frequency (RF) signals and/or data and may operate utilizing communication standards such as cellular 2G, 3G, or 4G, IEEE 802.11 or 802.16 standards, Bluetooth™, or combinations thereof. Alternatively, or in addition, the communication port 42 may be wired and may include connectors or couplers to receive metal conductor cables or connectors or optical fiber cables. The communication port 42 may be in communication with the processing element 34 and the memory element 38.

Figure 9:
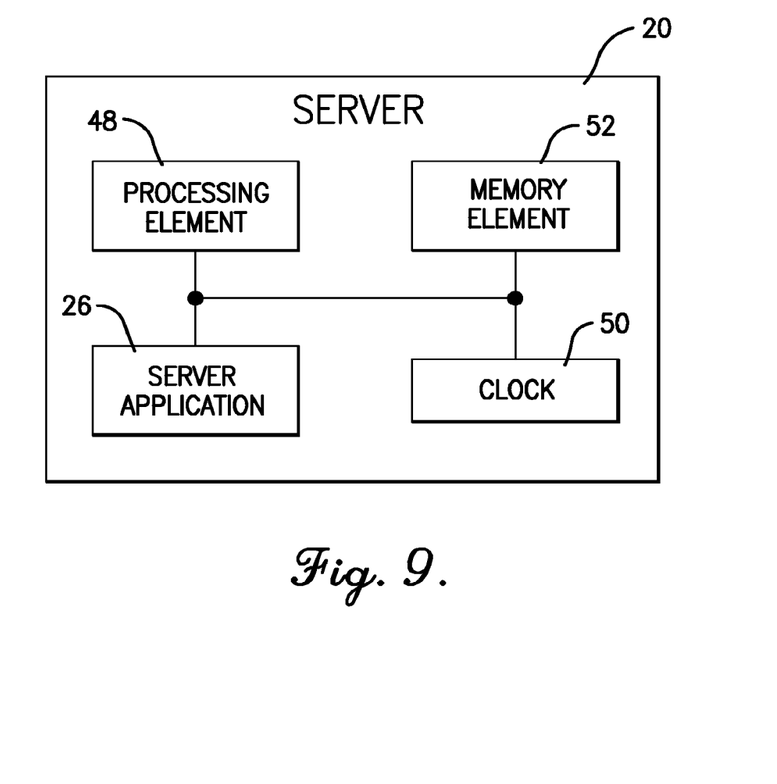
FIG. 9 is a schematic block diagram of the server.

The server 20, as seen in FIGS. 1 and 9, generally runs or executes the server application 26. The server 20 may include application servers, gaming servers, web servers, or the like, or combinations thereof. The server 20 may further include a processing element 48, a clock 50, and a memory element 52. The processing element 48 may be substantially the same as the processing element 28 in structure and function and may be accessed by the server application 26. The clock 50 may be substantially the same as the clock 30 in structure and function. The memory element 52 may be substantially the same as the memory element 32 in structure and function and may include or may constitute a computer-readable storage medium.

The display application 22 generally manages the displaying or showing of the game on the display 14. The display application 22 may also coordinate with an audio system to play the audio portion of the game. The display application 22 may include instructions, code, software, firmware, programs, applications, apps, services, daemons, or the like. In some embodiments, the display application 22 may be executed as markup language or scripting code that is executed from within a web browser, web viewer, or Internet browser. In other embodiments, the display application 22 may be executed as a standalone program or application on the client device 16. In still other embodiments, the display application 22 may be accessed through third-party social networking web sites. For example, a player may click on a link on a third-party social networking site that transfers the player to the display application 22.

The display application 22 is generally executed by a player wishing to start a game or participate in an event. Once executed, the display application 22 may include a synchronization process with the server 20, discussed in more detail below. The synchronization process may determine a client device clock offset, which is a time difference between the clock 30 of the client device 16 and the clock 50 of the server 20. The client device clock offset may also be thought of as a clock offset for the display 14 as well. As a result of the synchronization process, it may be determined that the client device clock offset is, for example, 1.5 seconds (s), indicating that the client device clock 30 is 1.5 s ahead of the server clock 50. In some instances, the client device clock offset may be negative, indicating that the client device clock 30 is behind the server clock 50. However, the (positive or negative) sign of the client device clock offset is arbitrary and could mean the opposite of what is mentioned above. Once the client device clock offset is determined, it may be recorded by the server application 26. In other embodiments and as will be discussed below, the display application 22 may include a synchronization process with the personal input 18.

Either before or after the synchronization process is executed, the display application 22 may receive from the server application 26 a list of types of interactive events (e.g., games) that can be played with the personal input 18. The player may select the type of game in which he is interested and then may be presented with the option of starting a new game. In exemplary embodiments, the game may correspond to a dance room. When the player selects a game, the server application 26 may transmit an event code to the display application 22 to be shown on the display 14. As an example, the event code may correspond to a dance room number. The event code may be in the form of an alphanumeric code, an ultrasonic code, or a quick response (QR) code that the player can either type into the personal input 18 or scan into the personal input 18. As will be discussed below, embodiments of the invention provide for a heuristic approach to communicating the event code to the display application 22.

Once the player has chosen a game to start, the display application 22 may request the game from the server application 26 running on the server 20. The display application 22 may then receive the game from the server 20 and may show the game on the display 14. In some embodiments, at least a portion of the game may be buffered on the client device 16, such as with the memory element 32, before it is shown on the display 14. The display application 22 may record an event start time (e.g., the time of day) at which the start of the game was displayed and may transmit the event start time to the server application 26. Furthermore, the display application 22 may monitor the progress of the game being shown on the display 14 to determine if the game is shown smoothly and completely. For example, if there are delays in the game being transmitted from the server 20, there may be a delay in the game being shown on the display 14. In such a situation, the display application 22 may send a message to the server application 26 that includes the time elapsed in the game and the amount of time by which the game has been delayed.

The display application 22 may also receive player scores from the server application 26. In various embodiments, the display application 22 may receive the top twenty player scores that are updated on a regular basis. The display application 22 may show the scores along with the associated player names in an area of the display 14 that does not interfere with the showing of the game. In embodiments of the invention, the display application 22 may show a subset of the scores along with the associated player names in an area of the display 14 that does not interfere with the showing of the game. The subset may be the scores and associated player names of the players having the three highest scores. In other embodiments, the subset may be of the players having the six highest scores. In yet other embodiments, the display application 22 may show aggregate information related to the scores, such as a percentage of players having an average score or a percentage of players having a high score relative to the other players of the game. This aggregate information may be generated from scores of all the players or may be generated from scores of a subset of the players.

After the game is completed, the display application 22 may show the name of the winner of the game along with his score. In embodiments of the invention where the client device 16 has access to an audio system, the display application 22 may instruct the audio system to announce the name of the winner of the game along with his score. In embodiments of the invention, the display application 22 may show an audio or video recording. As will be described below the recording is supplied by the event application 24.

The event application 24 generally synchronizes with the server 20 and manages the transfer of the sensor data from the personal input 18 to the server 20. In embodiments of the invention and as discussed below, the event application 24 does not transmit the sensor data to the server 20 but does transmit the score to the server. The event application 24 may include instructions, code, software, firmware, programs, applications, apps, services, daemons, or the like. The event application 24 may be executed on the personal input 18 by the player to play the game. Once executed and in embodiments of the invention, the event application 24 may include a synchronization process with the server 20, discussed in more detail below. The synchronization process may determine a personal input clock offset that is the time difference between the clock 36 of the personal input 18 and the server clock 50. Once the personal input clock offset is determined, it may be recorded by the server application 26. In embodiments of the invention and as will be discussed below, the event application 24 may include a synchronization process with the client device 16.

Either before or after the synchronization process, the event application 24 may prompt the player to enter the event code that identifies a particular game. The event code may be shown on the display 14 and may be scanned from the display 14 using a camera on the personal input 18 or may be entered using the user interface 46 on the personal input 18. In some embodiments, the event code may be scanned from another player's personal input 18. The event application 24 may further initialize and handshake with the server 20 by retrieving data from the sensor 40 and any user interface 46 inputs that are active and sending the data to the server 20. The server 20 may send data back to the personal input 18 that acknowledges the player's participation in the game, such as showing statistics of the game, showing a leader board, sending a command or code to vibrate the personal input 18, and so forth. As will be discussed below, embodiments of the invention provide for a heuristic approach to communicating the event code to the event application 24.

Once the game begins, the event application 24 may receive data from the sensor 40 at regular intervals, such as the sensor data capture rate. Different personal inputs 18 may capture sensor data at different rates. In order for the server application 26 to handle the sensor data from all of the different personal inputs 18 with different sensor data capture rates in a uniform fashion, the event application 24 may modify the sensor data to adapt to a single sensor data capture rate standard. Although other standard capture rates may be utilized, a standard capture rate of 20 Hz, or a 50 millisecond (ms) period, generally provides sufficient sensor data resolution without overloading the communication network 12 and the server 20 with too much data. Thus, the event application 24 may ignore or delete some of the sensor data if the data capture rate of the sensor 40 is greater than 20 Hz. Likewise, the event application 24 may perform a linear interpolation, or similar mathematical operation, on the sensor data if the data capture rate of the sensor 40 is less than 20 Hz. In addition, to further reduce the amount of data that is transmitted through the communication network 12 and handled by the server 20, the event application 24 may record just a single value for each sensor data capture. While the sensor 40 may supply three data components (for three-axis motion sensing), the event application 24 may calculate the vector magnitude of the three components to be recorded as the sensor data value.

In embodiments of the invention, the event application 24 transmits sensor data to the server 20. At certain intervals and in this embodiment, the event application 24 may create a packet that includes a plurality of sensor data capture values. The intervals may follow a schedule that is determined for each game. The schedule may correspond to actions of the game. In exemplary embodiments, the schedule may correspond to the performing of dance moves and may be variable. For example, one dance move may require 1 s to perform while another dance move may require 5 s to perform, and other dance moves may require times in between. Thus, a schedule may be created with a series of times relative to the beginning of the game that correspond to the dance moves of the game.

In embodiments, for the event application 24 to create the packets at the correct time, the server application 26 may transmit a personal input adjusted event start time, as discussed in more detail below, to the event application 24. As an example, the schedule may include the following times relative to the personal input adjusted event start time: 2.5 s, 4 s, 8 s, 9 s, 11.5 s, and so forth, indicating dance moves completing at each of those times. Accordingly, the event application 24 may create a packet for each of the listed time periods. A first packet may include sensor data captured between 0 s and 2.5 s. A second packet may include sensor data captured between 2.5 s and 4 s. The remainder of the packets may be created in the same fashion. Each packet may include the schedule time along with a block of sensor data that includes all of the sensor data capture values for the corresponding dance move. The packet may also include a timestamp from the personal input clock 36 and/or other relevant data. In various embodiments, the event application 24 may send and receive data using known packet protocols, such as transmission control protocol/internet protocol (TCP/IP). In embodiments of the invention where the event application 24 scores the player, the event application does not transmit sensor data to the server 24.

In embodiments of the invention, the event application 24 may generate and share an audio or video recording. In detail, the personal input 18 that runs the event application 24 may further include an audio capture device and/or a video capture device (herein "capture device"). The event application 24 provides to the user interface 46 displayed on the screen 44 of the personal input 18 an interface element. Once the event begins but before the game ends, the player may indicate, using the interface element, a desire to generate a recording using the capture device of the personal input 18.

Upon the player indicating a desire to generate a recording with the capture device, the event application 24 stops scoring the player and starts generating the recording. Now the player may use the personal input 18 to record the audio or video of themselves or of other players that are participating in the game at the same location as the player. The recording may continue until the end of the game. In embodiments, the recording may continue for a predetermined duration, such as ten or twenty seconds. In other embodiments, the recording may continue until the player indicates a desire to stop generating a recording. After the game has completed, the event application 24 sends the recording to the server 20, and the server sends the recording to the client device 16 to be shown by the display application 22. In embodiments of the invention, the server 20 publishes the video to an Internet-accessible video portal and sends a link to the recording to the personal inputs 18 of other players that are participating in the event. The other players may then share the recording to an electronic resource (such as a social network or website on the Internet) or view the recording on the personal inputs 18 of the other players.

The server application 26 generally supplies the game content. In embodiments of the invention the server application 26 may also pair the client device 16 with the personal input 18 and may also track the score of each player. The server application 26 may include instructions, code, software, firmware, programs, applications, apps, services, daemons, or the like. The server application 26 may be accessed when a player executes either the display application 22 or the event application 24. When initially accessed by the display application 22, the server application 26 may transmit to the client device 16 (to be shown on the display 14) a list of types of games that can be played with the personal input 18. The player may select the type of game in which he is interested and then may be presented with options such as starting a new game, joining a game that is about to begin, and so forth. The server application 26 may also present information such as high scores, player statistics, previous scores for the player, a profile for the player, and the like. The player generally chooses an option and the server application 26 transmits an event code to be shown on the display 14. At least the first player enters the event code on his personal input 18. Other players may enter the event code as well. In embodiments of the invention, the client device 16 transmits the event code to the personal input 18, as will be described later.

The server 20 may determine the client device clock offset with a synchronization process that includes the following steps. The steps may include or adapt at least a portion of the network time protocol (NTP) clock synchronization algorithm, where the role of server and client are inverted. The server 20 may send a first packet transmission to the client device 16 at time t0, which may refer to the local time of the server 20 and may be included as part of the first packet. The client device 16 may receive the first packet at time t1, which may refer to the local time of the client device 16. Subsequently, the client device 16 may send a second packet transmission back to the server 20 at time t2, which may refer to the local time of the client device 16 and may be included as part of the second packet. The second packet may also include the times t0 and t1. The server 20 may receive the second packet at time t3, the local time of the server 20. The round trip delay time (tRTD) is computed as $[(t3-t0)-(t2-t1)]$. The offset time (tOff) is computed as $[(t3-t2)+(t1-t0)]/2$. Each calculation of the round trip delay time and the offset time is referred to as a "sample", and the sending and receiving of the packets is "sampling". While the sampling is occurring, the server application 26 may also be calculating the standard deviation of the tRTD, the average (mean) of the tRTD, and the standard deviation of the tOff. The sampling may continue until a minimum number of samples have been taken. The sampling may stop when a maximum number of samples have been taken. An exemplary maximum number of samples may be 75. The sampling may also stop when the standard deviation of the tRTD is below a first threshold value, which is an indication that the round trip delay times are consistent. The sampling may further stop when the standard deviation of the tOff is below a second threshold value, which is an indication that the offset times are consistent. In addition, the sampling may stop when the average of the tRTD is less than the maximum value of the tRTD multiplied by a first factor, indicating that the round trip delay times are small. When the sampling has stopped, then a weighted tOff is calculated using the weight of the tRTD, thereby giving lower latency tOff time samples more weight than higher latency tOff time samples.

The weighted tOff represents the weighted average clock offset between the server 20 and the client device 16. A positive client device clock offset indicates that the client device clock 30 is ahead of the server clock 50, whereas a negative result indicates that the client device clock 30 is behind the server clock 50. Periodically, the server application 26 may repeat the synchronization process in order to account for clock drift or other factors that may change the offset. In various embodiments, the server application 26 may repeat the synchronization process every 1, 5, or 10 minutes.

When the server application 26 is accessed by the event application 24, the server application 26 may receive the event code for a particular game that is to be played by the player. The server application 26 may associate the event code with an address or other electronic data identifier that corresponds to the particular personal input 18. The event code may also identify the client device 16 that is receiving the game that the player is playing. In addition, the server application may also determine the personal input clock offset with the synchronization process discussed above, with the exception that the sampling occurs between the server 20 and the personal input 18. The server application 26 may also send other initializing commands or codes to the personal input 18 to alert the player that he has joined a game.

The server application 26 pairs the client device 16 with the personal input 18 through the exchange of an event code. Embodiments of the invention provide for a heuristic approach to communicating an event code to the display application 22 and the event application 24. In detail, the display application 22 connects to the server 20 and is assigned an event code. The client device 16 will store the event code during a first play session of the game. During a second play session the client device 16 will communicate the event code from the first play session (the last event code) to the server application 26 along with other identification information (e.g., the IP address, log-in information, etc.). The event application 24 also connects to the server 20. During the first play session the event application 24 may prompt the player to enter the event code. The event code is shown on the display 14 attached to the client device 16. The personal input 18 will store this event code during the first play session. During the second play session, the personal input 18 will communicate the last event code to the server application 26 along with other identification information.

The heuristic approach followed by the server application 26 tries to provide the client device 16 and the personal input 18 with the last event code to provide the player with consistency. In all instances when the client device 16 and the personal input 18 ask for a room number, the client device and the personal input also provide the identification information to the server 20. It is appreciated that the listed steps are for exemplary purposes and the steps may be different from those listed or the steps may be performed in a different order. First, if the IP address of the personal input 18 is shared with a single client device 16, then the server application 26 instructs both the display application 22 and the event application 24 to use the last event code. Second, if the IP address of the personal input 18 is not shared with a single client device 16, then the server application 26 determines if the last event code is unused by the server application. If the last event code is unused, then the server application 26 instructs the display application 22 and the event application 24 to use the last event code. Third, if a currently active client device 16 displays the last event code, then the server application 26 instructs the event application 24 to use the last event code. Fourth, if a currently active client device 16 is using the log-in credentials of the personal input 18 and is displaying a second event code, then the server application 26 instructs the event application 24 to use the second event code.

After the server application 26 has verified all of the players for a particular game, the server application 26 may transmit or stream the content of the game to the client device 16 to be shown on the display 14 for each client device 16 that requested to join the game. The server application 26 may continue transmitting the game to each client device 16 until the game has ended.

Once each client device 16 begins showing the game on the display 14, the display application 22 running on each client device 16 may transmit the event start time to the server application 26. The server application 26 may adjust the event start time to include the client device clock offset for each client device 16, thereby creating a client device adjusted event start time. The server application 26 may record each client device adjusted event start time.

The server application 26 may have utilized the event code to previously associate each player's personal input 18 with a client device 16 and accompanying display 14 on which the player's game is being shown. For each personal input 18, the server application 26 may further adjust the client device adjusted event start time of the associated client device 16 to include the personal input clock offset of the personal input 18, thereby creating the personal input adjusted event start time. The server application 26 may then transmit the personal input adjusted event start time to the event application 24 running on each personal input 18.

The game may be presented as a sequence of actions that previously have been determined to occur. In exemplary embodiments, the actions are previously-determined dance moves that are performed to a song. Before the game is released to the public, a reference data file may be created that includes the optimal responses to each event. Each game (or song) may have its own reference data file. The reference data file may be created by having an expert player, who is retaining a personal input 18, play the game while capturing and recording the sensor data from the sensor 1A. In exemplary embodiments, the reference data file is created by having a professional dancer dance to the song while holding or wearing a personal input 18. In addition, the sensor data may be measured at the standard data capture rate of 20 Hz, or one measurement every 50 ms. Accordingly, the reference data file may include an entry of measured data for every 50 ms of the song. Thus, for example, a three-minute song may have a reference data file with 3,600 entries (20 entries/second×180 seconds) of measured data timestamped at 50 ms intervals. As with the player's sensor data being transmitted from the personal inputs 18, each sensor data value of the reference data file is the vector magnitude of the measured sensor data. In some embodiments, the server application 26 may utilize more than one data files for the same game (or song) and average the data files to obtain the reference data file. For example, in embodiments of the invention, three data files may be obtained and then averaged (or other mathematical technique) to calculate the reference data file. The server application 26 may include, or have access to, the reference data file. In other embodiments, the event application 24 may include, or have access to, the reference data file. In alternative embodiments of the invention, the reference data file may be generated, including automatically generated, from a standardized or ideal model of the measured sensor data, as determined by a computer software program.

While the game is being played, each personal input 18 may be transmitting packets of sensor data, captured by the sensor 40, through the communication network 12 to the server 20. The score for each player is determined by his respective sensor data and how closely the sensor data matches the reference data. Accordingly, the server application 26 may compare the sensor data to the reference data. Each packet of sensor data includes a schedule time, relative to the beginning of the game (or song), and a block of sensor data. The server application 26 may retrieve data from the reference data file that corresponds to the data of the packet from the personal input 18. Following the example set forth above in discussing the event application 24, the server application 26 may retrieve reference data from 0 s to 2.5 s to compare to the first packet from the personal input 18. The server application 26 may retrieve reference data from 2.5 s to 4 s to compare to the second packet from the personal input 18, and so forth.

To calculate how close the sensor data is to the reference data, the server application 26 may perform a correlation, such as a Spearman rank correlation, between a player's sensor data and the reference data. Specifically, the server application 26 may perform a correlation between the player's sensor data and the reference data on a packet-by-packet basis—correlating a packet of sensor data to a corresponding block of reference data. Each packet of sensor data generally corresponds to a dance move. Thus, each dance move is scored separately. Typically, the greater the correlation between the player's sensor data and the reference data, the greater the score for the player. In addition, in some embodiments, the server application 26 may compare the player's sensor data with three reference data files and average the comparison results or use the median result to determine the player's score. The server application 26 performs the same comparison calculation for each player's sensor data and determines a score for each player. The server application 26 may identify a player by addresses or other alphanumeric identifiers contained within the packet data, such as within a header, that is transmitted from the personal inputs 18 to the server 20. The total score may be updated after each packet of sensor capture data, or corresponding dance move, is scored.

In embodiments of the invention, the server application 26 may also perform a motioned-based synchronization. The motion-based synchronization uses the sensor data contained in each packet sent from the personal input 18. In detail, when the server 20 receives a packet sent from the personal input 18, the packet contains sensor data for a time ts. Based upon the synchronization process, the server application 26 believes that time ts from the personal input 18 corresponds to time t2 from the reference data file located on the server 18. The server application 26 begins scoring based upon the time t2, but also analyzes times t0, t1, t3, and t4, for example (times t0-t4 are also times of the game from the reference data file). In this embodiment, t0 is 100 milliseconds before t2, t1 is 50 milliseconds before t2, t3 is 50 milliseconds after t2, and t4 is 100 milliseconds after t2. The forgoing are merely exemplary time intervals. More time intervals, or a different frequency between intervals, could be utilized depending on the game.

The server application 26 begins scoring the player based upon time t2. The server then can shift to scoring based upon time t1 or t3, if such a shift would generally correspond to a higher score for the player. In particular, the server application calculates how close the sensor data at time ts is to the reference data at t2. The server application also calculates how close the sensor data at time ts is to the reference data at time t1 and also to the reference data at time t3. If the sensor data at time ts is closer to the reference data at time t1 or to the reference data at time t3, then the server application will begin scoring the player based upon the reference data at time t1 or the reference data at time t3, respectively. So for example, the sensor data at time ts is closer to reference data at time t3 than at time t2, and the server application begins scoring the player based upon the reference data at time t3. The server application 26 now starts calculating how close the sensor data at time ts is to the reference data at time t2 and also time t4, and will adjust which reference data to score the player accordingly.

In embodiments, the server application will perform the motioned-based synchronization upon receipt of every packet. In other embodiments, the server application will perform the motioned-based synchronization upon receipt of every fifth packet or every tenth packet, respectively. In still other embodiments, the server application will perform the motion-based synchronization over a group of packets, each packet containing distinct sensor data from the personal input 18.

In embodiments of the invention, the server application 26 does not perform the calculation of a score based on the player's sensor data. Instead, the event application 24 calculates the score of the player and then transmits the score to the server application 26. In detail, the personal input 18 contains a data file that has the reference data for the game, wherein the data file is received from the server application 26. In other embodiments, the personal input 18 contains more than one data file for the same game (or song) and averages the data files to obtain the reference data for the game. The player's score is determined by how closely the sensor data from his personal input 18 matches the reference data. Accordingly, the event application 24 may compare the sensor data to the reference data. Each item of sensor data includes a schedule time, relative to the beginning of the game.

For the event application 24 to calculate how close the sensor data is to the reference data, the event application may perform a correlation (i.e., a Spearman rank correlation). Specifically, the event application 24 may perform a correlation between the sensor data and the reference data on an item-by-item basis. Thus, the game is segmented into a plurality of segments, with each segment corresponding to a dance move, and each segment (i.e., dance move) is scored separately. The total score may be updated after each item of sensor data, or corresponding dance move, is scored.

The event application 24 will periodically transmit the score to the server application 26. In detail, the event application 24 may create a packet that includes the total score. The intervals may follow a schedule that is determined for each game. The schedule may correspond to actions of the game. In exemplary embodiments, the schedule may correspond to the performing of dance moves and may be variable. The server application 26 may identify a player by addresses or other alphanumeric identifiers contained within the packet data, such as within a header, that is transmitted from the personal inputs 18 to the server 20.

In the embodiment where the event application 24 calculates the score of the player, the personal input 18 is still paired and synchronized with the client device 16. The server 20 will perform the pairing and the synchronization process, as described earlier. In summary, the server application 26 transmits the event code to the client device 16 and the personal input 18. The server application 26 may then determine the client device clock offset by sampling the client device 16. In addition, the server application 26 may also determine the personal input clock offset with the synchronization process discussed above, with the exception that the sampling occurs between the server 20 and the personal input 18. The personal input clock offset is then communicated to the personal input 18. In embodiments, the server 20 will periodically perform the synchronization process with the client device 16 and the personal input 18. In this embodiment, the personal input clock offset is also periodically communicated to the personal input 18.

In other embodiments where the event application 24 calculates the score of the player, the server will not perform the pairing process or the synchronization process. In detail, the client device 16 transmits audio data to the personal input 18. The client device is capable of transmitting audio data in the ultrasonic range or above 18 kilohertz ("kHz"). In embodiments of the invention the client device transmits audio data in the range of 18 kHz to 23 kHz. The client device 16 will repeatedly transmit the audio data to the personal input 18.

The audio data contains game information comprising information related to the game, such as the event code for the game and that the client device has started displaying the game. The game information also provides the current status of the game, such as whether the game is currently being played, the progress of the game (the current time of the song), and whether there are any buffering problems. Because the client device 16 will repeatedly transmit the audio data to the personal input 18, players may join a game that is currently in progress.

The sensor 40 of the personal input 18 receives the audio data from the client device 16. The event application 24 periodically scans the audio data for the game information. Once the event application 24 receives the game information that the client device 16 has started displaying the game, the event application will begin scoring the player. In embodiments, the game information includes a message that the client device will begin displaying the game after a specified amount of time. In this embodiment, the event application still receives the audio data and begins scoring the player after the specified amount of time.

The server application 26 may transmit a predetermined number of, scores to all of the client devices 16 so that the scores can be shown on the displays 14. After the game is over, the server application 26 may transmit the top scores to each client device 16 to be shown on the display 14. In addition, the server application 26 may transmit each player's score to his or her personal input 18. Furthermore, the server application 26 may transmit the commands or codes to the personal input 18 of the winner so that the personal input 18 lights up, makes a sound, vibrates, or combinations thereof. In embodiments where the player has generated a recording, the sever application 26 sends a copy of the recording to the client devices 16 so that the recording can be shown on the displays 14. In addition, the server application 26 may transmit a link to the recording to each player's personal input 18. In embodiments where the player has indicated a desire to share the recording to an electronic resource, the server application 26 may perform the sharing of the recording.

Figure 6:
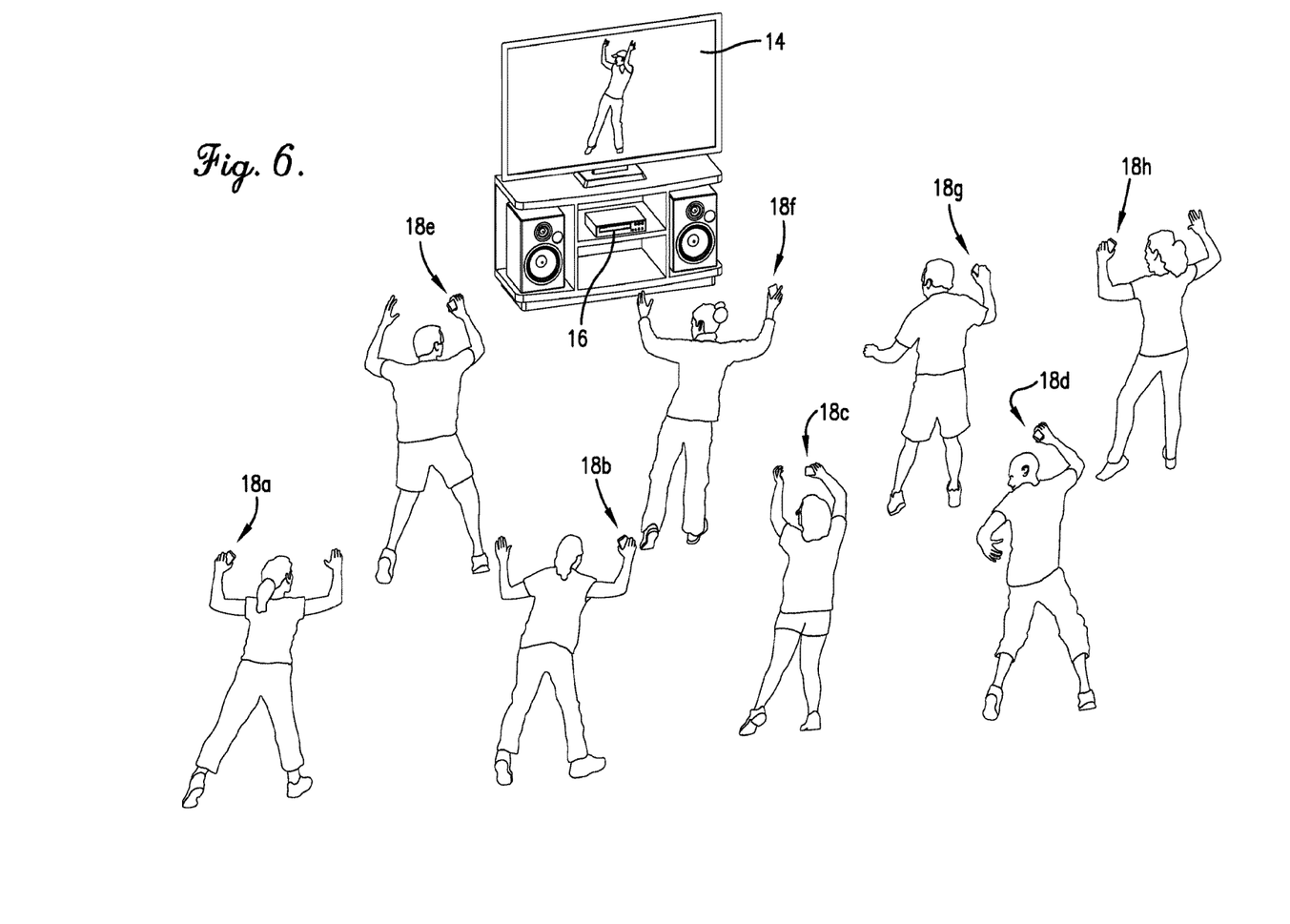
FIG. 6 is an environmental view from a rear perspective of a plurality of players playing the electronic game, each player holding a personal input, the figure further depicting the display and the client device.

The system 10 may operate as follows. A plurality of participants may be interested in participating in an interactive event. For example, a plurality of players may be interested in playing a game—typically, as contestants in the same game. In some situations, the players may be geographically separated with each player having his own client device 16, display 14, and personal input 18, as seen in FIGS. 2-5. In other situations, a plurality of players may share the same location such as a large room, a hall, an auditorium, or the like, wherein each player possesses his own personal input 18a-18f, but all the players view the same display 14 (with one or more screens) connected to a client device 16, as shown in FIG. 6. In any case, one or more players may use the display application 22 being executed on a client device 16. In certain situations, the players may first access a third-party social networking program on the client device 16 that has a link to the display application 22. The players may then select the link to access the display application 22. In such situations, the name of the player, as registered with the third-party social networking program, may be passed on to the display application 22 and used to identify the player when displaying scores and so forth.

Once the players choose a game to play, the server application 26 may transmit an event code to each client device 16 that requested the game. The event code may be shown on the display 14. The event code may identify the particular game as well as the particular client device 16 that is receiving the game. The players may then enter the event code on their personal inputs 18, which subsequently transmits the event code to the server 20. The server application 26 may then engage in the synchronization process with both the display application 22 and the event application 24, as discussed above. These processes may determine the client device clock 30 offset and the personal input clock 30 offset.

After the initialization and synchronization are complete, the server application 26 may transmit, or stream, the game to all of the client devices 16 that requested it. Each display application 22 may transmit the event start time to the server application 26. The server application 26 may adjust the each event start time to form the client device adjusted event start time associated with each client device 16. For each personal input 18, the server application 26 retrieves the associated client device adjusted event start time and further adjusts it with the personal input clock offset to form the personal input adjusted event start time. The server application 26 may then transmit the appropriate personal input adjusted event start time to each personal input 18.

As the game is shown on the displays 14, the players may respond by dancing and mimicking the motions of the dancer on the display 14. Typically, a player may hold the personal input 18 in his or her hand while dancing, or the personal input 18 may by coupled to the player's arm or wrist. The sensor 40 may record sensor data as the player moves while dancing, and the event application 24 may convert the sensor data to the standard data capture rate, if necessary. Furthermore, the event application 24 may create packets of sensor data that correspond to certain actions of the game, such as dance moves. Each packet may include a time that is relative to the personal input adjusted event start time and a block of sensor data that includes the sensor data captured for the period of time during which the event (dance move) occurred. The time may be one of a plurality of times that is part of a predetermined schedule that has recorded the start time of each event (dance move). The packets are communicated from the event application 24 of each personal input 18 to the server application 26.

The server application 26 receives the sensor data packets from each personal input 18 and may identify the source of each packet by an address or other electronic data identifier that may be parsed from the packet. The address may be associated with a particular player, and thus the sensor data may be associated with the player as well. Each packet includes the starting time of the block of sensor data. The server application 26 may retrieve the reference data from the reference file with the same starting time to compare with the player's sensor data. The server application 26 may perform a correlation on the player's sensor data and the reference data to determine a score for the block of data and thus the event (dance move) of the game. Generally, a higher correlation results in a higher score. The server application 26 may perform the same calculations and accumulate the score for each player as the game continues.

As the game is being shown on the display 14, the display application 22 may monitor its progress. If there is a delay in receiving the game from the server 20 that results in an interruption of the game being shown on the display 14, the display application 22 may send a message to the server application 26, noting the amount of the delay. The server application 26 may in turn communicate a message to the event applications 24 running on the personal inputs 18 of the players watching the interrupted display 14. The event application 24 may adjust the personal input adjusted event start time by the amount of the delay so that the sensor data capture packets will include the correct sensor data. In some embodiments, the event application 24 may discard the sensor data that was captured during the delay of the game on the display 14.

After the game is over, the highest scores may be shown on each display 14. Furthermore, the server application 26 may transmit the commands or codes to the personal input 18 of the winner so that the personal input 18 lights up, makes a sound, vibrates, or combinations thereof.

Although the invention has been described with reference to the embodiments illustrated in the attached drawing figures, it is noted that equivalents may be employed and substitutions made herein without departing from the scope of the invention as recited in the claims. For example, the invention has been described with reference to a predetermined set of actions, such as a computerized avatar performing a set of dance movements. Embodiments of the invention comprise determining the reference data file and comparing a measured sensor data file to the reference data file so as to score a player that is mimicking the avatar's dance movements. However, in other types of games, such as a first-person shooter ("FPS") type game or reaction-based games (e.g., a quiz game) that do not involve a predetermined set of time-based actions, a certain subset of features of embodiments of the invention may only need to be performed. For example, determining the clock offset of each player's personal input and display could be applied to most games where many players share the same screen and each players personal input has an individually variable latency. Furthermore, it is to be understood that the invention does not require a pre-recorded choreography—any player may dance in front of the other players and act as the reference dance. Determining the score would be different as there would be no standard reference data to which each player's sensor data would be compared. The score would then be determined by comparing one player's sensor data with another player's sensor data directly. For example, in a quiz game, the sensor data would correspond to the player's actuating a response button, and the clock offset would determine the offset of the personal input's clock. In even further embodiments of the invention, the interactive event may be participating in karaoke, with the personal input having a sensor for receiving audio, such as the microphone as discussed above. Yet further types of interactive events may be a fitness event that instructs the user on performing a fitness routine and monitors, via the sensors associated with the personal input, the user's accuracy in performing the routine or the user's capabilities in performing the routine, such as exerting a particular force as monitored by the force/load sensor.

Having thus described various embodiments of the invention, what is claimed as new and desired to be protected by Letters Patent includes the following:

1. A non-transitory computer readable storage medium with an executable program stored thereon for participating in an interactive event, wherein the program instructs a processing element to perform the following steps:
   receiving a request sent by at least one client device for participating in an interactive event,
   wherein the client device does not have executable code for the interactive event when the request is sent;
   responsive to the request, transmitting executable code for the interactive event to the at least one client device to allow the interactive event to be shown on a display;
   receiving feedback related to a performance from at least one first personal input from a first input device and from at least one second personal input from a second input device, wherein the feedback is in the form of sensor data or a score,
   wherein the first input device is distinct from the second input device,
   wherein at least one of the first input device and the second input device is associated with the client device;
   receiving a recording from the at least one second personal input,
   wherein the recording is captured from a sensor located on the at least one second personal input; and
   transmitting the recording to the at least one client device to be shown on the display.

2. The non-transitory computer readable storage medium of claim 1, wherein the program further instructs the processing element to transmit the recording to the at least one first personal input.

3. The non-transitory computer readable storage medium of claim 1, wherein the sensor located on the at least one second personal input is a microphone and the recording is an audio recording of a player, the player using the at least one first personal input.

4. The non-transitory computer readable storage medium of claim 1, wherein the sensor located on the at least one second personal input is a camera and the recording is a video recording of the player, the player using the at least one first personal input.

5. The non-transitory computer readable storage medium of claim 1, wherein the processing element stops receiving feedback related to the performance from the at least one second personal input.

6. The non-transitory computer readable storage medium of claim 1, wherein the performance corresponds to a dance performed by a user of the client device.

7. The non-transitory computer readable storage medium of claim 1, wherein the sensor is an accelerometer.

8. The non-transitory computer readable storage medium of claim 1, wherein the at least one personal first input is at least one mobile phone.

9. The non-transitory computer readable storage medium of claim 1, wherein the at least one personal first input is at least one smart watch.

10. The non-transitory computer readable storage medium of claim 1, wherein the recording includes video data and audio data.

11. One or more non-transitory computer-readable media storing executable instructions that, when executed by a processor, perform a method of participating in an interactive event, the method comprising the steps of:
   receiving a request made by a user to participate in the interactive event,
   wherein the one or more non-transitory computer-readable media do not store executable code for the interactive event when the request is sent;
   transmitting an indication of the request to participate to a remote server associated with the interactive event;
   responsive to the request, receiving, from the remote server, data including executable code for the interactive event;
   executing the executable code to display, on a display, an event application associated with the data for the interactive event;
   receiving, from the user and via a sensor, user input responsive to the event application;
   receiving, from at least one personal input, feedback related to the user's participation in the interactive event;
   scoring the user's participation in the interactive event based on at least one of the feedback and the user input; and
   transmitting a score based on the step of scoring to the remote server associated with the interactive event.

12. The media of claim 11, wherein the display is associated with the processor.

13. The media of claim 11, wherein the sensor is an accelerometer.

14. The media of claim 11, wherein the user input is received via a plurality of sensors.

15. The media of claim 11, wherein the interactive event corresponds to a dance room.

16. The media of claim 11, wherein the data for the interactive event includes an event code.

17. The media of claim 11, wherein the method further comprises the steps of:
   receiving, from the remote server, score data for the interactive event; and
   displaying, on the display, a leaderboard for the interactive event.

18. The media of claim 11, wherein the interactive event includes a plurality of players.

19. The media of claim 11, wherein the user input corresponds a dance performed by the user.

* * * * *